March 22, 1927.
A. F. SCHMAND
1,621,956
CANDY MACHINE
Filed June 17, 1924
3 Sheets-Sheet 2
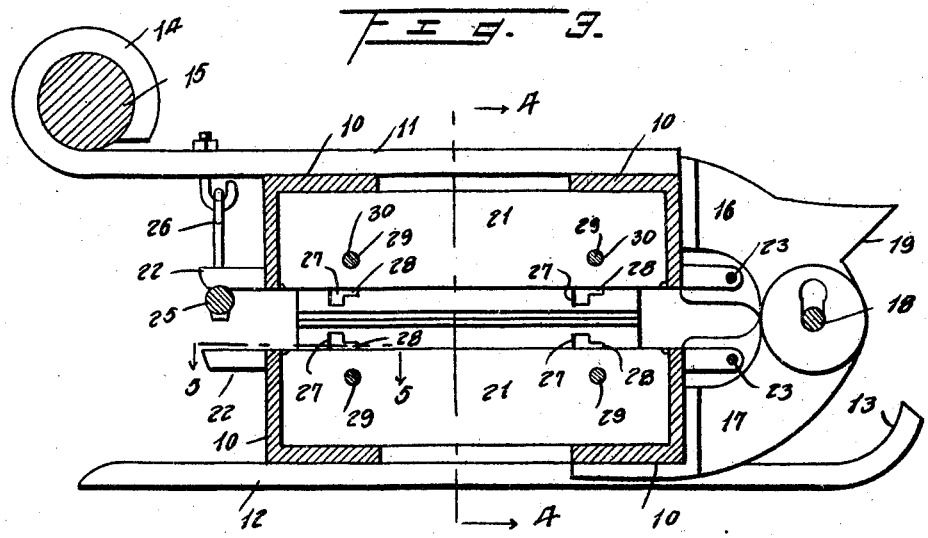
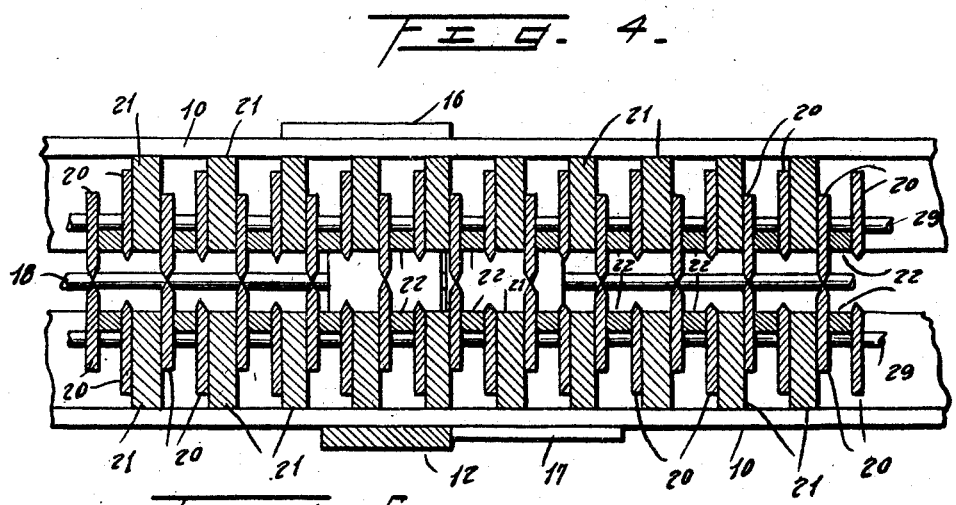
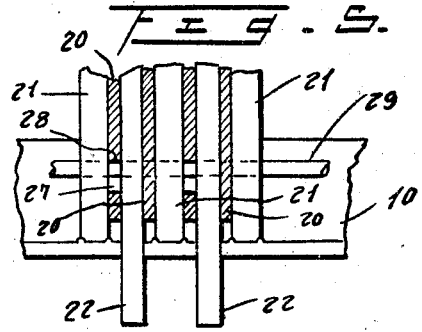
Inventor
A. F. Schmand,
By
Attorney

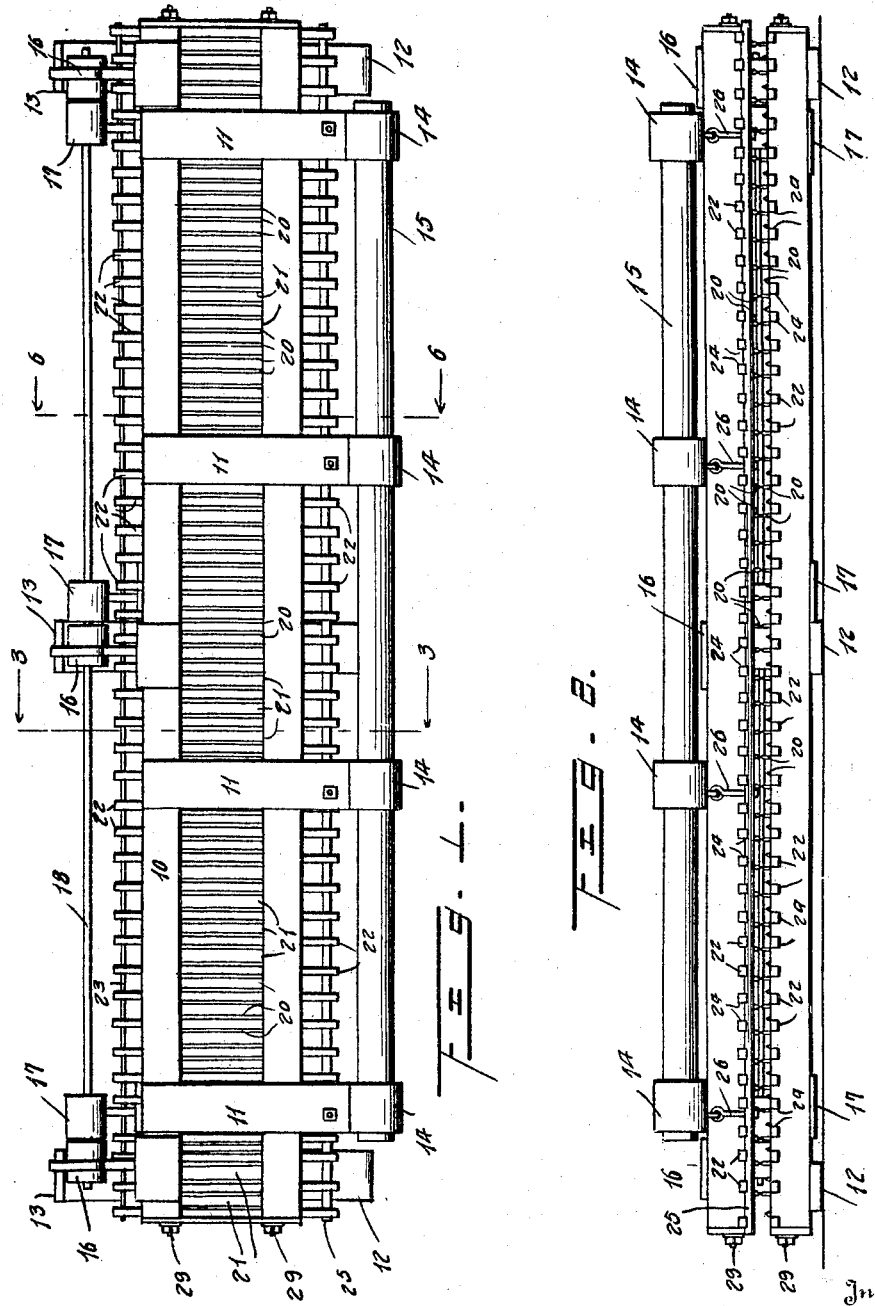

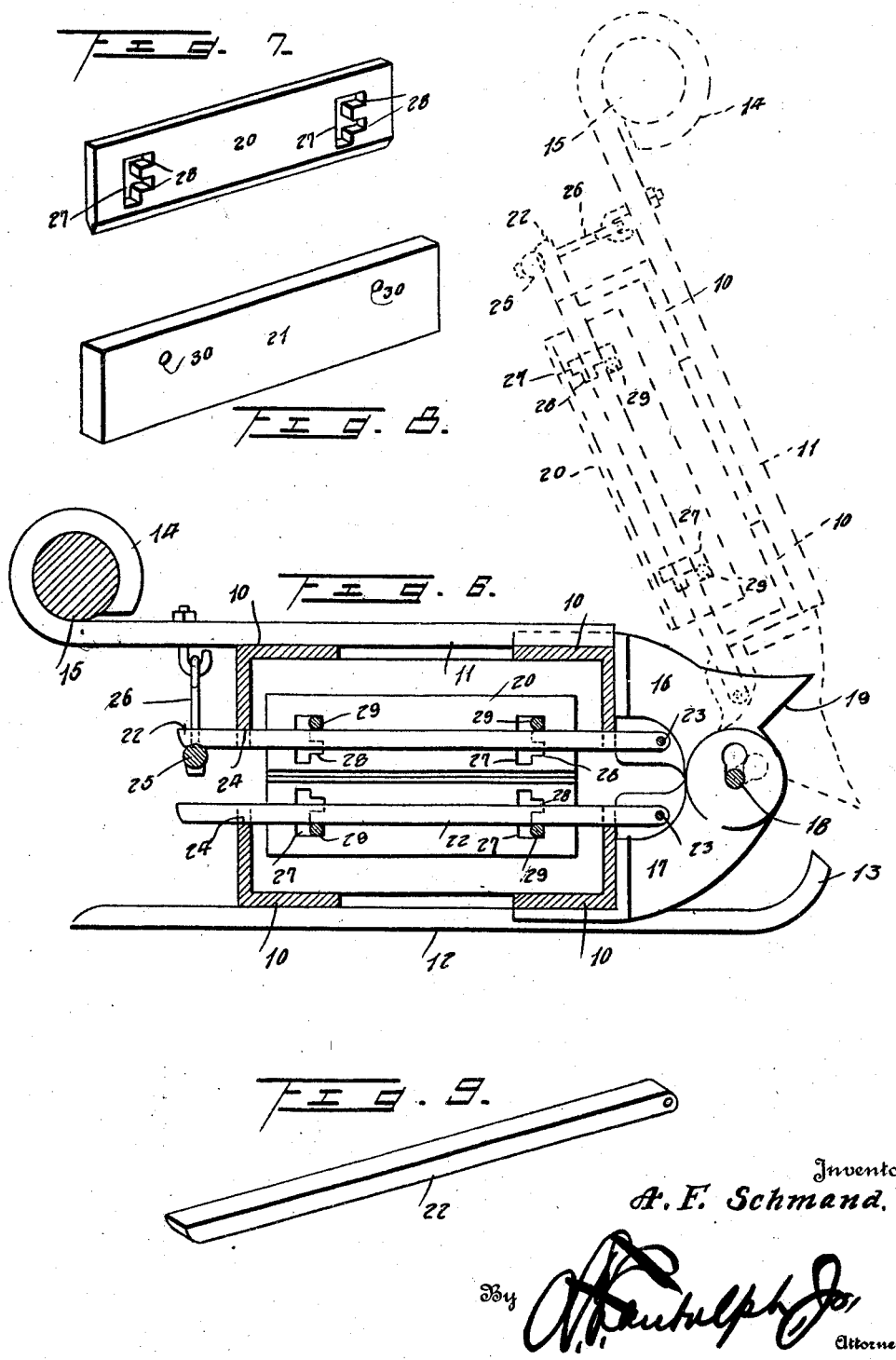

Patented Mar. 22, 1927.

1,621,956

UNITED STATES PATENT OFFICE.

ALBERT F. SCHMAND, OF LITTLE ROCK, ARKANSAS.

CANDY MACHINE.

Application filed June 17, 1924. Serial No. 720,603.

The present invention provides a machine for cutting up candy into pieces of uniform and required size, the machine embodying cutters which are adjustable and different sets of spacers between the cutters, the spacers of one set being fixed and the spacers of the other set hinged.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a top plan view of a candy machine embodying the invention;

Figure 2 is a front view thereof;

Figure 3 is a vertical transverse sectional view on the line 3—3 of Figure 1;

Figure 4 is a detail sectional view on the line 4—4 of Figure 3, looking in the direction of the arrows;

Figure 5 is a horizontal sectional view on the line 5—5 of Figure 3;

Figure 6 is a vertical transverse sectional view on the line 6—6 of Figure 1, the guide lines showing the upper section or part of the machine thrown upward;

Figure 7 is a detail perspective view of an adjustable cutter;

Figure 8 is a detail perspective view of a fixed spacer; and

Figure 9 is a detail perspective view of a hinged spacer.

Corresponding and like parts are referred to in the following description and designated in the several views of the drawings by like reference characters.

The machine comprises upper and lower parts or sections which are similar in construction and hingedly connected so as to open and close by a pivotal movement. Each of the sections or parts comprises a frame which includes angle bars 10 and connecting bars 11 and 12. The bars 11 connect the angle bars 10 of the upper part or section and the bars 12 connect the angle bars of the lower part or section. The connecting bars 12 project forwardly and rearwardly as shown most clearly in Figures 3 and 6, and the rear ends are curved upwardly as indicated at 13 to provide stops to limit the pivotal movement of the upper part or section when thrown into open position. The connecting bars 11 project forwardly and are bent into eyes 14 through which is passed a bar 15 which forms a handle for operating the machine by swinging the upper part or section upwardly and downwardly as indicated by the dotted and full lines in Figure 6. Hinge members 16 project rearwardly from the upper frame or section and corresponding hinge members 17 project rearwardly from the lower frame or section and the adjacent ends of these hinge members overlap and receive a pintle 18 which pivotally connects the parts. The hinge members 16 have projections 19 which form stops to co-act with the stops 13 to limit the upward pivotal movement of the upper frame or section of the machine.

Each of the frames or sections is provided with a plurality of cutters 20 and sets of spacers 21 and 22, the spacers 21 being fixed and the spacers 22 hinged. The hinged spacers 22 of each of the frames or sections are pivotally mounted upon a rod 23 which is supported by the respective hinge members 16 and 17. The outer edge of the vertical flange of the several angle bars 10 is notched as indicated at 24 to receive the hinged spacers 22 and hold the same in predetermined position. The upper hinged spacers are prevented from dropping down at their front ends by means of a rod 25 upon which they rest, said rod being suspended from the projecting ends of the bars 11 by means of links 26 which admit of the rod 25 being moved outwardly to clear the spacers 22 when it is required to drop the forward ends thereof for any purpose.

Each of the cutters 20 is provided adjacent each end with a vertical slot 27 and lateral notches 28 at one side of the vertical slots to provide for adjustment of the cutters. Rods 29 pass through the vertical slots 27 of the cutters and through openings 30 of the fixed spacers 21 and serve to hold the same in the required position. When the cutters 20 are moved to cause the rods 29 to enter the notches 28 the position of the cutters 20 is fixed. When the cutters 20 are moved to bring the vertical slots 27 in line with the rods 29 the cutters may be adjusted vertically and when adjusted to the required position the cutters are fixed by moving the same to cause the rod 29 to enter the notches 28 in register therewith, as shown most clearly in Figure 6.

In the operation of the machine, the candy is prepared in the usual way and formed into a cane which is placed between the upper and lower parts or sections of the machine after which the upper section previously thrown into position is closed, thereby causing the cutters of the two frames or sections to sever the cane into pieces of predetermined size, determined by the space between the co-acting cutters and the diameter or size of the cane, as will be readily understood. By providing the hinged spacers 22 arranged alternately with the fixed spacers 21 provision is made for releasing center blades 20 to arrange the mechanism to cut the candy cane into desired lengths, and as the hinged spacers 22 snugly engage the cutter blades 20 they will be held against lengthwise movement in the frames.

What is claimed is:—

1. A candy machine of the character specified, comprising similar upper and lower members, each of the members comprising adjustably mounted cutters and intermediate sets of spacers, one set of spacers being fixed and the other set of spacers alternating with the fixed spacers and hingedly secured.

2. A candy machine of the character specified, comprising similar upper and lower members, each of the members comprising adjustably mounted cutters and intermediate sets of spacers, one set of spacers being fixed and the other set of spacers alternating with the fixed spacers and hingedly secured, and a supporting rod for the front ends of the hinged spacers and adapted to be moved outwardly to clear said spacers when it is required to drop them for any purpose.

3. A candy machine of the character specified, comprising complemental members hingedly secured to one another, each of said members including cutters provided with vertical slots and lateral notches in communication with the vertical slots, rods passing through the vertical slots of the cutters and adapted to engage lateral notches thereof and hold the cutters in required adjusted position, and spacers arranged between the cutters, one set of spacers being fixed and carrying the rods aforesaid, and the other set of spacers alternating with the fixed spacers, hingedly secured, and adapted to clamp the cutters in adjusted positions.

4. A candy machine of the character specified, comprising two members hingedly secured together, each member comprising parallel angle bars having the outer edges of a flange of each bar notched, hinged spacers fitted in the notches of the angle bars, fixed spacers intermediate the hinged spacers, adjustable cutters disposed between the sets of spacers and having vertical slots and lateral notches, and rods passing through openings in the fixed spacers and co-acting with the slots and notches of the cutters to hold the latter in the required adjusted position.

In testimony whereof I affix my signature.

ALBERT F. SCHMAND.